(12) United States Patent
Fruhauf et al.

(10) Patent No.: US 9,081,946 B2
(45) Date of Patent: Jul. 14, 2015

(54) SECURE MASS STORAGE DEVICE

(75) Inventors: Serge Fruhauf, Cupertino, CA (US);
David Tamagno, Austin, TX (US);
Andre Dostie, Framingham, MA (US);
John N. Tran, Austin, TX (US); Klaus P. Uehlecke, Austin, TX (US); Sean R. Newton, Austin, TX (US)

(73) Assignee: STMICROELECTRONICS, INC., Coppell, TX (US)

( * ) Notice: Subject to any disclaimer, the term of this patent is extended or adjusted under 35 U.S.C. 154(b) by 1223 days.

(21) Appl. No.: 11/392,028

(22) Filed: Mar. 29, 2006

(65) Prior Publication Data

US 2007/0239990 A1    Oct. 11, 2007

(51) Int. Cl.
*H04L 9/00*    (2006.01)
*G06F 21/32*   (2013.01)
*G06F 21/80*   (2013.01)

(52) U.S. Cl.
CPC ............... *G06F 21/32* (2013.01); *G06F 21/80* (2013.01)

(58) Field of Classification Search
CPC .................................. G06F 21/80; G06F 21/32
USPC .......... 711/100, 115, 103; 726/31, 24, 34, 19, 726/20; 709/12, 14; 705/59; 713/117, 168, 713/174, 122, 202, 185
See application file for complete search history.

(56) References Cited

U.S. PATENT DOCUMENTS

| | | | |
|---|---|---|---|
| 6,439,464 B1 | 8/2002 | Fruhauf et al. | 235/492 |
| 6,748,541 B1 | 6/2004 | Margalit et al. | 713/201 |
| 6,763,399 B2 | 7/2004 | Margalit et al. | 710/13 |
| 2002/0073340 A1 | 6/2002 | Mambakkam et al. | 713/202 |
| 2003/0005336 A1* | 1/2003 | Poo et al. | 713/202 |
| 2004/0268133 A1 | 12/2004 | Lee et al. | 713/186 |
| 2005/0054438 A1* | 3/2005 | Rothschild et al. | 463/29 |
| 2005/0097338 A1 | 5/2005 | Lee | 713/186 |
| 2005/0182973 A1* | 8/2005 | Funahashi et al. | 713/202 |
| 2005/0235141 A1 | 10/2005 | Ibrahim et al. | 713/164 |
| 2006/0204047 A1* | 9/2006 | Dave et al. | 382/115 |
| 2007/0033320 A1* | 2/2007 | Wu et al. | 711/100 |
| 2007/0174548 A1* | 7/2007 | Wang | 711/115 |
| 2007/0180539 A1* | 8/2007 | Holtzman et al. | 726/34 |
| 2008/0289032 A1* | 11/2008 | Aoki et al. | 726/19 |

FOREIGN PATENT DOCUMENTS

| | | | |
|---|---|---|---|
| GB | 2 387 933 | 10/2003 | G06F 1/00 |
| WO | 01/23987 | 4/2001 | G06F 1/24 |
| WO | 03/003282 | 1/2003 | G06K 9/00 |

* cited by examiner

*Primary Examiner* — Brandon Hoffman
*Assistant Examiner* — Nega Woldemariam
(74) *Attorney, Agent, or Firm* — Allen, Dyer, Doppelt, Milbrath & Gilchrist, P.A.

(57) ABSTRACT

A USB mass storage device includes a memory, USB interface and USB controller. A biometric circuit provides biometric authentication and a secure microcontroller is operatively connected to the biometric circuit and the USB controller and operative in accordance as a trusted platform and having a command set to access security functions and trust authentication of a user using the biometric circuit.

23 Claims, 4 Drawing Sheets

SECURE MASS STORAGE DEVICE

FIELD OF THE INVENTION

The present invention relates to the field of mass storage devices, and more particularly, this invention relates to USB mass storage devices.

BACKGROUND OF THE INVENTION

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires (VBus and ground), and data is carried with the other two wires (D+, D−). The latest version of the USB is currently defined by the Universal Serial Bus Specification Revision 2.0, written and controlled by USB Implementers Forum, Inc., a non-profit corporation founded by the group of companies that developed the USB Specification. This specification is incorporated herein by reference in its entirety. The increasingly widespread use of the USB has led manufacturers to develop USB interfaces for connection of their products to host computers to complement the existing serial and parallel interfaces. These devices are becoming increasingly smaller, such as USB mass storage tokens.

One type of mass storage device is a USB flash drive that is typically a NAND-type flash memory integrated with a USB interface. It uses the USB mass storage standard for removable storage devices. In many examples of such devices, a small printed circuit board is encased in a plastic housing, allowing a standard type-A USB connection (or interface) to be connected directly to a port on a personal computer. The flash drives are active when powered by a USB computer connection and typically require no other external power source or source of battery power.

Usually the drives are run off a limited supply and are forwarded by a USB connection of about 5 volts and up to 500 milliamps. The flash drive typically includes the mail type-A USB connector and a USB mass storage controller that implements a USB host controller to provide a linear interface to some type of block-oriented serial flash devices. This could contain a small RISC microprocessor and some on-chip ROM and RAM. In this type of circuit, a NAND flash memory chip stores the data and a crystal oscillator provides a clock signal and controls the data output. An LED could indicate data transfer or data reads and writes in some devices.

Typically, these flash drives and similar USB mass storage devices implement a USB mass storage device class, allowing most computer systems to read the device. Most USB flash drives do not use a write-protect mechanism. Some flash drives, however, encrypt data using an encrypted file system, including True Crypt, CryptoBuddy and Private Disk as examples. It is believed there have been some proposals for biometric fingerprinting, but these proposals have not been commercially implemented and the design has been technically complete and expensive.

It should be understood that the large acceptance of USB mass storage devices and flash drives in the PC world, and their use in corporate environments, indicates that the products are becoming ubiquitous for a PC user. These portable devices are USB "plug-and-play" compliant. They are small in size and are often lost with their sensitive information, including sensitive data, keys, or credentials of a user. Additionally, with the proliferation of USB devices, the user may have to connect a multitude of USB products to a user's computer to store information, to authenticate at the computer, network or web page, to pay on-line, or to encrypt sensitive data and verify the integrity of a platform application.

There are proposals to implement smart card technology to USB mass storage devices, but much of the hardware security provided by a smart card chip is limited to its use of the ISO 7816 protocol to communicate with a USB controller. It would be advantageous to incorporate a physical interface such as the USB, low pin count (LPC), Inter Integrated Circuit (I2C), serial peripheral interface (SPI), or other serial or parallel input/output interface such as the InterChip USB with a higher protocol layer not based on ISO 7816-3.

Some USB flash drive devices offer content protection by user name and password access, and use software encryption having a memory partition using a public and secure area. A security token could be made from a USB token, including a custom USB controller, or made from two chips, i.e., a smart card in a USB controller with a smart card reader functionality such as described in U.S. Pat. Nos. 6,748,541 and 6,763,399 to Margalit et al., the disclosures which are hereby incorporated by reference in their entirety. As disclosed generally in these references, a smart card chip can communicate to a USB controller using an ISO 7816 interface and protocol. In other examples, the token could use a USB reader with an ISO 7816 smart card or USB smart card as defined in ISO 7816-12.

Some proposals, such as disclosed in U.S. Patent Publication No. 2002/0073340 published on Jun. 13, 2002, disclose a secure mass storage device having an embedded biometric record that blocks access by disabling plug-and-play configuration. The system can use a thumbprint that is captured and compared to templates to either block the secured drive access or continue initializing the secured drive to allow access. Although some biometric circuit is provided in the disclosure, it may not provide the desired level of trusted authentication.

SUMMARY OF THE INVENTION

It is therefore an object of the present invention to provide a mass storage device that can operate as a USB peripheral with data integrity without using the ISO 7816-3 protocol.

It is still another object of the present invention to provide a mass storage device that can be a trusted USB peripheral having data integrity and provide a user secure authentication and mass storage capability.

A USB mass storage device includes a memory for storing data. A USB interface couples the USB mass storage device to a host computer. A USB controller is operatively connected to the memory and USB interface and operative for transferring mass storage data between the host computer and memory. A biometric circuit provides biometric authentication of a user. A secure controller is operatively connected to the biometric circuit and the USB controller and operative in accordance as a trusted platform. It has a command set to access security functions and trust authentication of a user using the biometric circuit.

In yet another aspect, the secure controller is operatively connected between the biometric circuit and the USB controller. This secure controller can be operative to access security functions performed by logic that complies with the Trusted Computing Group (TCG) specification. The biometric circuit can be formed as one of a capacitance, optical and RF scanner circuit. The memory can be formed as a non-volatile memory such as EEPROM, NVRAM or flash memory.

In yet another aspect of the present invention, a serial communications interface interconnects the USB controller and secure controller and can be formed as one of at least a RS232, I2C, SPI or interchip USB communications link. A serial communications interface can interconnect the secure controller and the biometric circuit.

In yet another aspect of the present invention, a USB mass storage system includes a computer host that includes a USB interface and receives mass storage data through the USB interface and communicates with the USB mass storage device.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting example of the present invention, the mass storage device is operative as a secure USB mass storage device, for example, a USB flash drive, which integrates several devices into one. The mass storage device has hardware security and a similar level of protection profile as a smart card to secure content. A user can have secure authentication with mass storage capability and operability as a trusted USB peripheral. The mass storage device includes data integrity and does not use the ISO 7816-3 protocol. It has compatibility with the Trusted Platform Module (TPM) as instituted by the Trusted Computing Group (TCG) initiative. The device can include key, credential and password storage into a secure memory in accordance with the standard. The password can be replaced by a biometric sensor.

In one non-limiting example of the present invention, a system has a USB host and a USB peripheral connected one-to-one to each other. The USB host could be a PC host, an embedded PC host, or an embedded USB host in a consumer or telecom application. The USB peripheral could offer several functions, including (a) a USB mass storage class function for storing data of a user, and (b) security functions, for example, storing public, private and symmetric keys, or cryptographic hashing for integrity checking, or digital signing or sealing data to a system state. These functions can be used by security applications running on top of the hardware and software driver.

Figure 1:
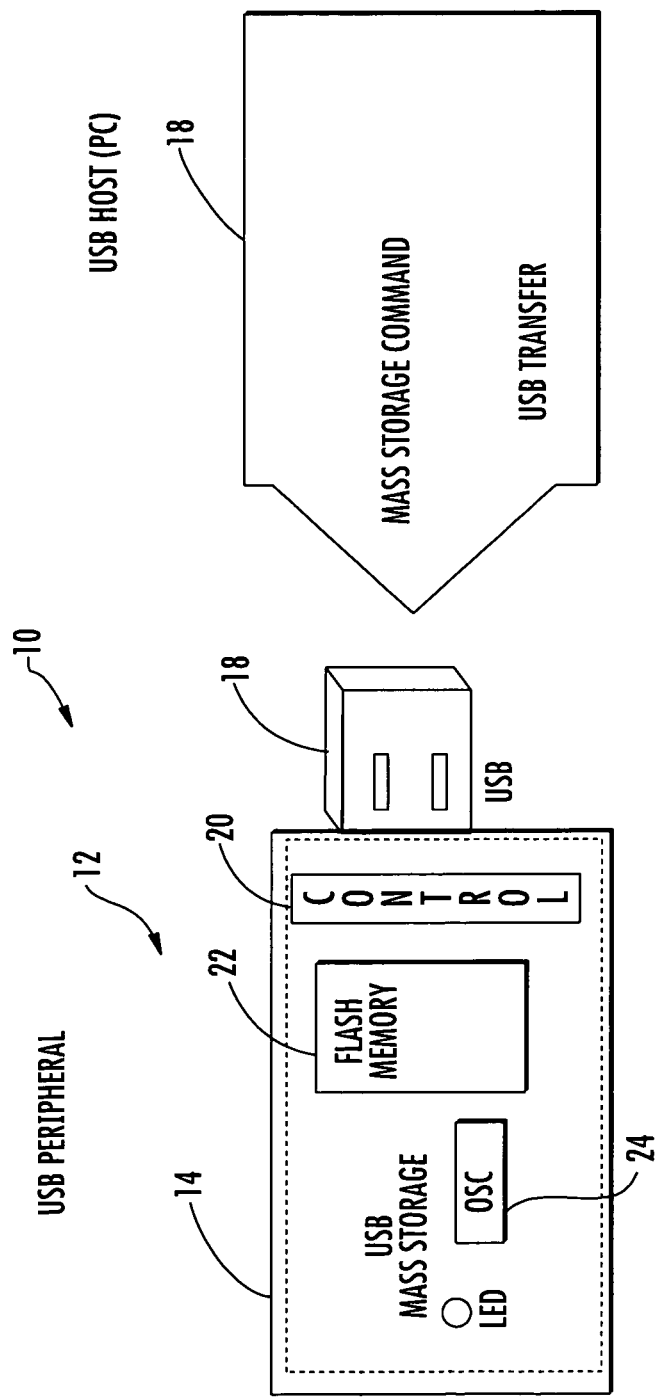
FIG. 1 is a block diagram showing a typical mass storage device operative as a USB flash drive and showing basic functional components.

FIG. 1 shows an example of a typical USB mass storage device system 10 that includes a typical USB peripheral such as a USB mass storage device formed as a USB flash drive in this non-limiting example. It should be understood that the device 12 could be a secure token or other mass storage device. The device 12, in this non-limiting example, includes a housing 14 defining the USB mass storage token or flash drive device and a male type-A USB connector 16 that provides an interface to the USB host computer 18. Other components could include a USB mass storage controller 20 that implements a USB host controller and provides a seamless linear interface to a memory 22 such as typical block-oriented serial flash devices as a flash memory. This USB controller 20 could include a small RISC microprocessor and some on-chip ROM and RAM. The memory 22 could be formed as a NAND flash memory chip that stores data. A crystal oscillator 24 could provide the clock signal to control the device data output such as by using a phase-locked loop. An LED can indicate data transfers or the read and write of data. The USB host 18 as a PC could issue a mass storage command to allow a USB transfer.

It should be understood that although a flash drive is described, the mass storage device could be a USB mass storage token or other mass storage device, including in some embodiments a reconfigured smart card or similar device.

Figure 2:
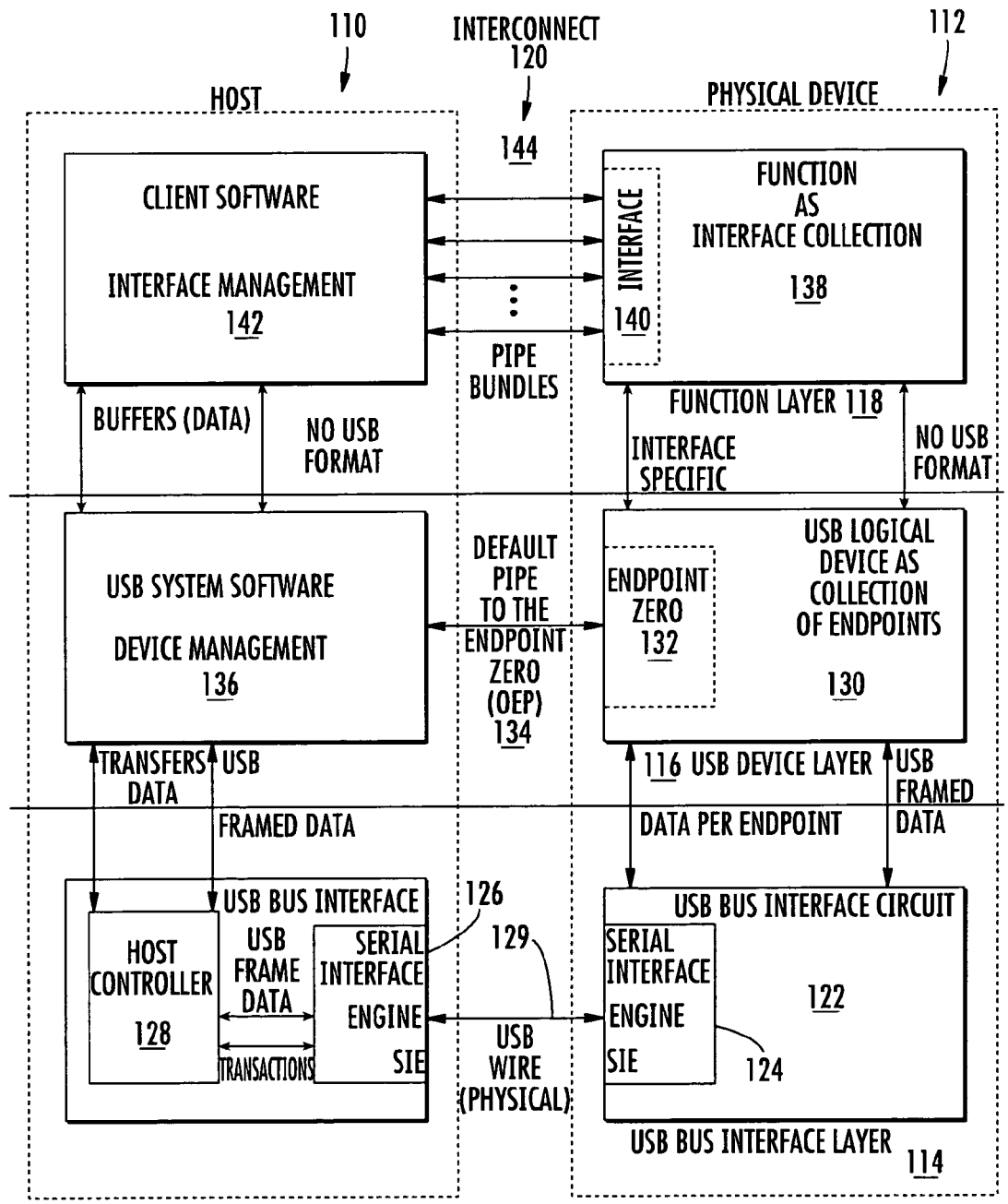
FIG. 2 is a block diagram of a USB showing the different data transport mechanisms, pipes and a USB-relevant format of transported data between the host and interconnective physical devices as taught in the universal serial bus specification revision 2.0.

For purposes of background and description, the basic USB data flow between a USB host and a USB device and the various implementations and layers in accordance with the universal serial bus specification 2.0 are set forth in FIG. 2.

As shown in FIG. 2, the connection of a host 110 to a physical device 112 requires the interaction between different layers, i.e., the USB bus interface layer 114, USB device layer 116, and function layer 118. An interconnect 120 between the host and device is illustrated.

The USB bus interface layer 114 includes a USB bus interface circuit 122 and serial interface engine (SIE) 124 at the device 112 that communicates with a serial interface engine (SIE) 126 and its host controller 128 at the host 110 via a physical wire 129. The USB device layer 116 includes at the physical device 112 a collection of endpoints as a USB logical device 130. An endpoint zero 132 is operable in communication via the default pipe 134 to USB system software 136 that is operable for device management at the host 110. The function layer 118 includes at the physical device 112, a logical function 138 as an interface collection, and the interface 140 that communicates via a plurality of pipe bundles 144 to client software 142 that is operable for interface management.

The USB bus interface layer 114 provides the physical wire 129 for the traffic signaling and packet conductivity between the host 110 and physical device 112. The USB device layer 116 views the USB system software 136 to perform generic USB operations with the physical device 112 via the default pipe 134 to endpoint zero 132. The functional layer 118 adds capabilities to the host using matched client software. The USB Device Layer 116 and Function Layer 118 each view logical communications within their layers and use the USB Bus Interface Layer 114 for any data transfer. The USB host 110 coordinates the overall USB system, controls access, and monitors the USB topology.

Logical communications exist between the client software and the Function Layer 118 and the USB system software 136 and USB logical device 130. Actual packets flow between the USB host controller 128 and the USB bus interface circuit 122.

As is known, USB physical devices add functionality to the host and have the same interface. Each physical device carries and reports configuration-related data, which it forwards to the host to allow the host to identify and configure the USB device. Typically, devices on the USB are connected to a host using a tiered star topology, including the hub. The host, on the other hand, communicates with each logical device as if it were directly connected to a root port. The client software manipulates a USB function interface of a device only as an interface of interest.

It should be understood that the actual communication flows across several interface boundaries. The two software interfaces for the host are a host controller driver (HCD) and a USB driver (USBD). A software interface between a USB host controller 178 and USB system software 176 implements the host controller driver and allows the host controller to implement functions without requiring the host software to be dependent on any particular implementation. One USB driver can support different host controllers. Specific knowledge of a host controller implementation is not required.

The USB logical device 130 can be considered a collection of endpoints and are grouped into endpoint sets to implement the interface. The USB system software 136 manages or controls the device using the default pipe 134 to the endpoint zero 132. Client software 142 manages the interface using pipe bundles 144 associated with an endpoint set. Data is moved between a buffer on the host 110 and an endpoint on the USB device 112 when client software requests the data. The host controller 128 or USB device 112, depending on the direction of data transfer, packetizes the data and forwards the packets over the bus. It also coordinates bus access. The host communicates with the physical device using a desired communication that is designed to match any communication requirements of the physical device and transfer characteristics provided by a USB.

The endpoint is an identifiable portion of the device that terminates the communication between the host. It can be a collection of independent endpoints. Default control uses input and output endpoints and the endpoint number "zero" as part of the default pipe 134.

The data transport mechanism includes transfers of data between the host controller 128 and the USB system software 136 at the host 110. Buffers can be used as a data transport mechanism between the USB system software 136 and the client software 142 at the host 110. The other data transport mechanism includes transactions between the host controller 128 and the serial interface engine 126 within the USB bus interface of the host.

The data transport mechanism also exists as a data per endpoint between the USB bus interface circuit 122 and the USB logical device 130 at the physical device 112. The data transport mechanism between the function 138 (and with the interface 140) and the endpoint zero 132 is interface-specific.

USB-relevant format of transported data occurs as USB frame data between the serial interface engine 126 and the host controller 128 and between the host controller 128 and the USB system software 136 at the host 110. No USB format for transporting data exists between the client software 142 that manages an interface and the USB system software 136.

At the device 112, USB-relevant format of transported data exists as USB frame data between the USB bus interface circuit 122 and the USB logical device 130. No USB format of data occurs between the interface 140 and the endpoint zero 32 at the device 112.

Further details of the functioning of the USB host and device and data flow can be found in the Universal Serial Bus Specification Revision 2.0, including Chapter 5 entitled "USB Dataflow Model," the disclosure for the entire Specification Revision 2.0 which is hereby incorporated by reference in its entirety.

Figure 3:
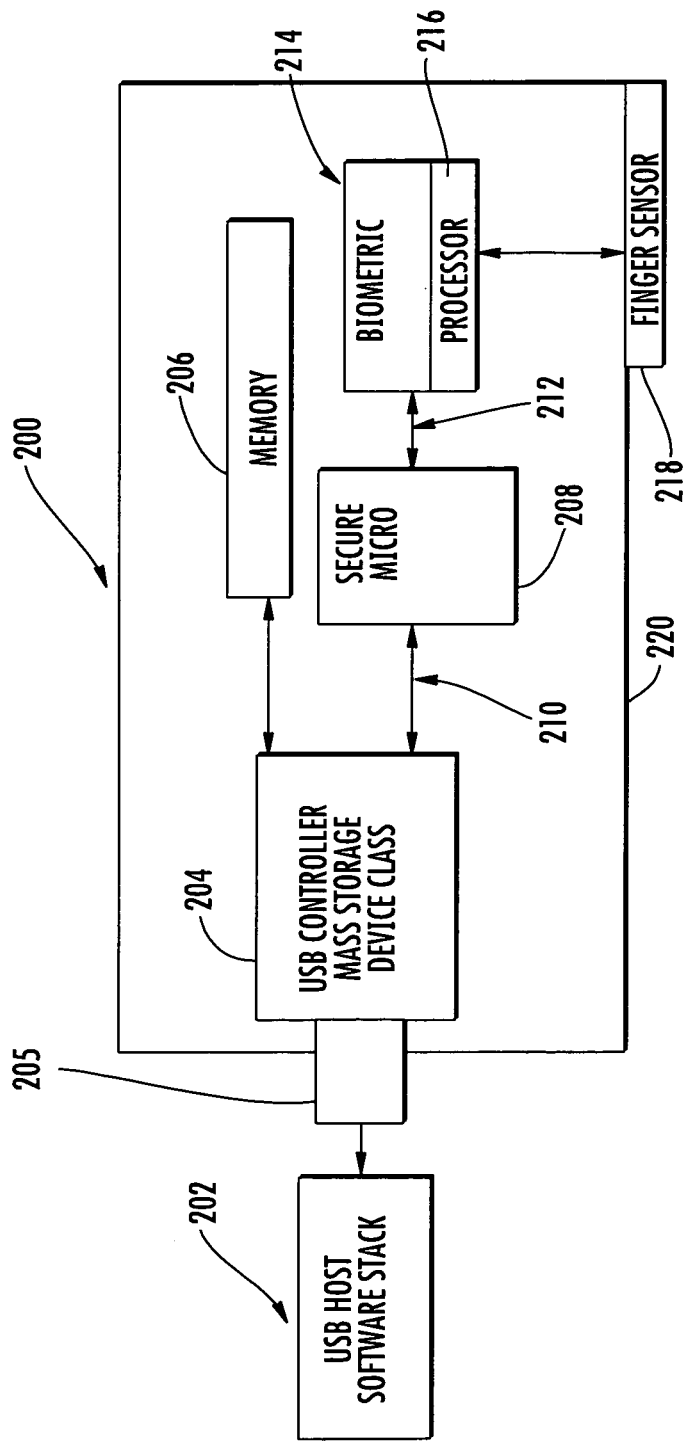
FIG. 3 is a block diagram of a secure USB mass storage device that includes a biometric circuit and secure controller in accordance with a non-limiting example of the present invention.

FIG. 3 is a block diagram of a mass storage device 200, in accordance with a non-limiting example of the present invention. It is illustrated as a USB peripheral and configured as a USB mass storage device, for example, formed as a USB flash drive or other type of USB mass storage token and operative with a USB host software stack 202. This type of USB mass storage device 200 includes security with a secure controller and biometric circuit, such as a fingerprint sensor, to form a secure, USB mass storage device as will be explained below. The secure controller could be a microcontroller or microprocessor and the term controller can be used for both.

As illustrated, the basic components of this USB peripheral 200 include a USB device controller 204, i.e., a USB controller in this non-limiting example. The USB controller 204 interfaces with a USB interface 205 and communicates with the USB host via the USB protocol and provides a serial and parallel interface communicating to a non-volatile memory 206, for example, an EEPROM, NVRAM or flash memory. Communication can be via the protocol required by a selected type of memory and a serial interface communicating to a secure controller 208, for example, a microcontroller or microprocessor as a Trusted Platform Module (TPM) product via a communications interface 210, such as SPI, I2C, LPC or USB, in case of an interchip USB (chip-to-chip) if the system architecture allows it. It should be understood that an RS232 connection could also be used.

The secure controller 208 can provide an optional secondary serial interface 212 communicating to a biometric circuit 214 as a separate subsystem that includes a biometric sensor, for example, fingerprint sensor 218, and a biometric processor 216, for example, operative as a coprocessor, which securely stores a biometric template into the USB peripheral to authenticate a user. This biometric circuit 214 can allow biometric authentication of a user to the mass storage device 200, while the secure controller 208 allows trusting of the authentication.

In this non-limiting example, the secure controller 208 allows a TPM command to access security functions. An SPI interface as a serial peripheral interface and its related protocol have been found advantageous for use between the USB controller 204 and the secure controller 208. The non-volatile memory 206 can be a flash memory type NAND, as known by those skilled in the art. The biometric circuit 214 has a coprocessor 216 that is operative with the finger sensor 218 or other sensor receiving section typically positioned on an outer housing 220 forming the USB mass storage device (or peripheral) as illustrated.

The secure controller 208 as a TPM can store keys, passwords, and digital certificates and could be affixed to any support or board positioned within the housing 220 defining the mass storage device 200. The secure controller 208 can also protect and authenticate user passwords. The secure controller typically acts as a "slave" to higher level services and applications by storing and reporting pre-run time configuration information in some non-limiting examples. Typically, the secure controller can use a low pin count (LPC) bus interface and provide crypto capabilities. A hardware engine can perform up to 2,048 bit RSA encryption/decryption. It can use a built-in hash engine to compute hash values or small pieces of data. It can also use a random number generator to generate keys for various purposes.

An endorsement key can be used as a public/private key pair of about 2,048 bits and could be unique to a particular TPM and platform. The attestation identity key (AIK) can authenticate a service provider. Different certificates can be used and stored, including an endorsement certificate, platform certificate and conformance certificate. The endorsement certificate can contain the public key of the endorsement key and provide attestation that a particular "TPM" is genuine and the endorsement key is protected. Platform certification can be provided by a platform vendor and provide attestation that the security components of a platform are genuine. A conformance certificate can be provided by a platform vendor or an evaluation laboratory.

The TPM secure controller can access any TCPA software stack (TSS) using a TPM device driver library. A TSS uses modules and components to support functionality to the TPM. The TSS can off load security function to a CPU. The TPM can encrypt data using a one-time symmetric key that can be protected by TPM.

It should be understood that the biometric subsystem can include many different types of biometric systems. The illustrated fingerprint sensor (or scanner) is a preferred design in this non-limiting, example. It is possible to use many different types of biometric circuits that can sense or scan physical characteristics, for example, the face, fingerprints, irises or veins. Alternatively, the biometric circuits can sense or scan behavioral characteristics, including voice, handwriting or typing rhythm depending on the size of the housing used with the mass storage device and whether it can support such sensor pad or circuit. For example, it is possible not only to analyze a letter in a handwriting detection system, but it is also possible to analyze the act of writing, such as pressure, speed and rhythm with which one writes an initial or name on a sensor pad. Accuracy can be determined by a False Except Rate (FAR), False Reject Rate (FRR), Failure To Enroll Rate (FTE) and Failure To Acquire Rate (FTA).

It is possible to use some systems that have a voice print recognition system, such that wave patterns can be memorized and sound spectrograms used for identity detection. Voice print recognitions could also be used. It is also possible to use layered systems that combine biometrics with a keycard or Personal Identification Number (PIN) and systems that combine multiple biometric methods, including an iris scanner, a voice print system or fingerprint sensor. Iris scanning is possible and is typically not the same as retinal scans in which a picture of the blood vessel structure in the back of the eye is scanned. It is possible to use vein geometry in which a camera takes a digital picture of a vein structure in for example, a hand, using near-infrared light.

The preferred fingerprint sensor or scanner would obtain an image of a finger and determine whether any pattern of ridges and valleys in the image matches the pattern of ridges and valleys in a prescan image. Optical scanning and capacitance scanning could be used. The optical scanners would typically include a Charge Coupled Device (CCD) with its own light source and an array of light embedding diodes. Capacitance scanners use a tiny array of cells that include conductor plates covered with insulating layers or other similar systems in some non-limiting examples. Feed back loops could be used in such systems. It is also possible to use RF signals to detect a fingerprint ridge and valley pattern, where a fingerprint pattern can be read from the conductive layer of skin beneath the dry outer surface skin layer. Pixel sensor plates could be operative with an excitation signal reference plane in a semiconductor substrate having sense amplifiers that are output. The templates would be stored as part of the biometric circuit 214.

Figure 4:
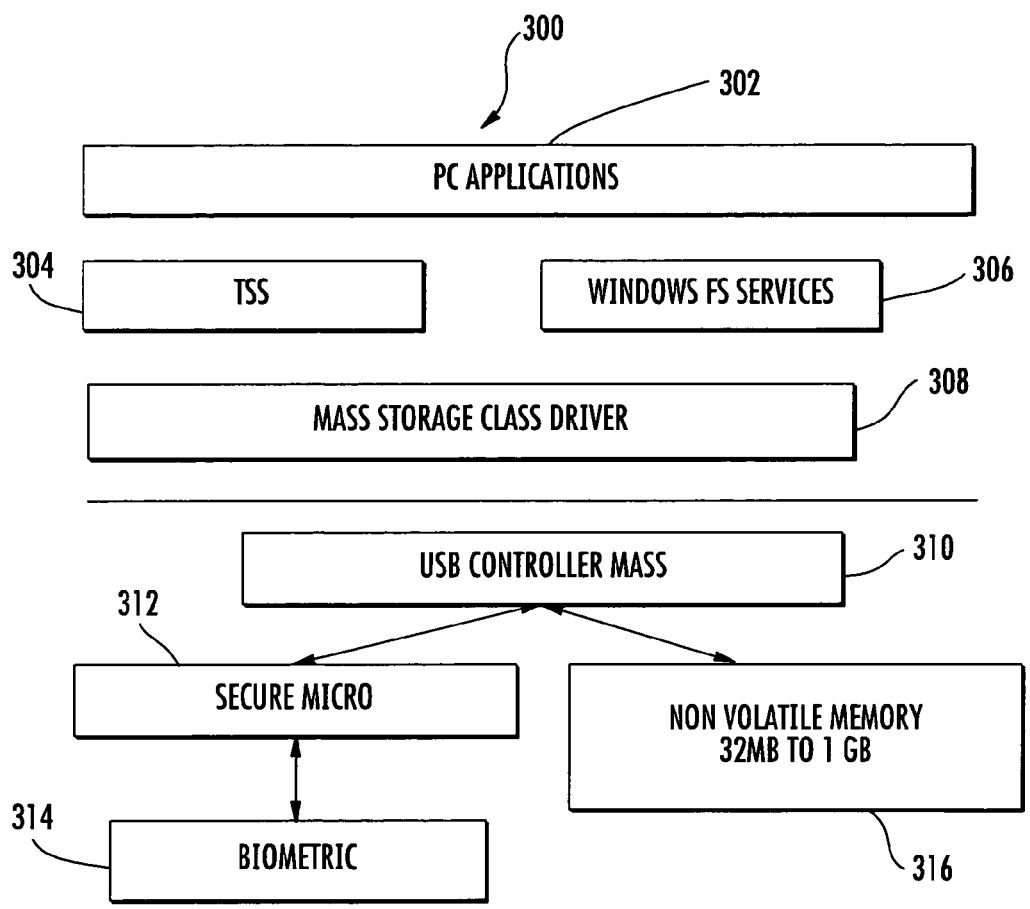
FIG. 4 is a high-level block diagram of an example of a software stack configuration that can be used in accordance with a non-limiting example of the present invention.

FIG. 4 shows a software stack 300 with a top level depicted as PC applications 302 operative with the TSS 304 and a windows file system (FS) services 306 as part of the flash system and memory, and operative with a mass storage class driver 308. The USB controller 310 is operative as a mass storage class driver and operative with the secure micro TPM 312 and the biometric subsystem 314. The USB controller as a mass storage device class is also operative with non-volatile memory such as 32 megabytes to one gigabyte.

It should be understood that the TSS software specification can provide a standard application programming interface for accessing functions of the TPM. A USB firmware library can also be included.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A USB mass storage device, comprising:
a memory for storing data;
a USB interface for coupling to a host computer;
a USB controller operatively connected to said memory and USB interface and operative for transferring mass storage data between the host computer and memory;
a biometric circuit that provides biometric authentication of a user and comprising a processor and associated database that stores physical characteristics of a user and a circuit that senses the physical characteristics of the user and wherein said processor compares the physical characteristics as sensed with physical characteristics as stored to make a comparison for authenticating the user; and
a secure controller operatively connected between said biometric circuit and said USB controller and configured to store a user password and endorsement key unique to the secure controller and used as a public/private key, an attestation identity key (AIK) to authenticate the host computer, and a digital certificate containing a public key of the endorsement key and attest the endorsement key is protected, and operative in accordance as a trusted platform and having a command set to access security functions and confirm the user password and authenticate the user using the biometric circuit and provide access to the host computer using the public/private key after the host computer is authenticated.

2. A USB mass storage device according to claim 1, wherein said secure controller is operative to access security functions performed by logic that complies with the Trusted Computing Group (TCG) specification.

3. A USB mass storage device according to claim 1, wherein said biometric circuit comprises one of a capacitance, optical and RF sensor circuit.

4. A USB mass storage device according to claim 1, wherein said memory comprises a nonvolatile memory.

5. A USB mass storage device according to claim 4, wherein said nonvolatile memory comprises an EEPROM, NVRAM or Flash memory.

6. A USB mass storage device according to claim 1, and further comprising a serial communications interface interconnecting said USB controller and said secure controller.

7. A USB mass storage device according to claim 6, wherein said serial communications interface comprises one of at least a RS232, I2C, SPI or interchip USB communications link.

8. A USB mass storage device according to claim 1, and further comprising a serial communications interface interconnecting said secure controller and said biometric circuit.

9. A USB mass storage device according to claim 8, wherein said serial communications interface comprises a SPI or interchip USB communications link.

10. A USB mass storage system, comprising:
a computer host that includes a USB interface and receives mass storage data through the USB interface; and
a USB mass storage device, comprising,
a memory for storing data;
a USB interface for coupling to the USB interface of the host computer;
a USB controller operatively connected to said memory and USB interface and operative for transferring mass storage data between the host computer and the memory;
a biometric circuit that provides biometric authentication of a user and comprising a processor and associated database that stores physical characteristics of a user and a circuit that senses the physical characteristics of the user and wherein said processor compares the physical characteristics as sensed with physical characteristics as stored to make a comparison for authenticating the user; and
a secure controller operatively connected between said biometric circuit and said USB controller and configured to store a user password and endorsement key unique to the secure controller and used as a public/private key, an attestation identity key (AIK) to authenticate the host computer, and a digital certificate containing a public key of the endorsement key and attest the endorsement key is protected, and operative in accordance as a trusted platform and having a command set to access security functions and confirm the user password and authenticate the user using the biometric circuit and provide access to the host computer using the public/private key after the host computer is authenticated.

11. A USB mass storage system according to claim 10, wherein said secure controller is operative to access security functions performed by logic that complies with the Trusted Computing Group (TCG) specification.

12. A USB mass storage system according to claim 10, wherein said biometric circuit comprises one of a capacitance, optical and RF sensor.

13. A USB mass storage system according to claim 10, wherein said memory comprises a nonvolatile memory.

14. A USB mass storage system according to claim 13, wherein said nonvolatile memory comprises an EEPROM, NVRAM or Flash memory.

15. A USB mass storage system according to claim 10, and further comprising a serial communications interface interconnecting said USB controller and said secure controller.

16. A USB mass storage system according to claim 15, wherein said serial communications interface comprises one of at least a RS232, I2C, SPI or interchip USB communications link.

17. A USB mass storage system according to claim 10, and further comprising a serial communications interface interconnecting said secure controller and said biometric circuit.

18. A USB mass storage system according to claim 17, wherein said serial communications interface comprises a SPI or interchip USB communications link.

19. A method for securing an external USB mass storage device, which comprises:
storing data within a memory of the USB mass storage device;
transferring mass storage data between the memory and host via a USB controller operative with a USB interface;
authenticating a user using a biometric circuit and a processor and database that stores physical characteristics of a user and a circuit that senses the physical characteristics of the user and wherein the processor compares the physical characteristics as sensed with physical characteristics as stored to make a comparison for authenticating the user; and
accessing security functions of a secure controller operatively connected between said biometric circuit and said USB controller and configured to store a user password and endorsement key unique to the secure controller and used as a public/private key, an attestation identity key (AIK) to authenticate the host computer, and a digital certificate containing a public key of the endorsement key and attest the endorsement key is protected, and operative in accordance with a trusted platform and having a command set to access security functions and confirm the user password and authenticate the user using the biometric circuit and provide access to the host computer using the public/private key after the host computer is authenticated.

20. A method according to claim 19, which further comprises accessing security functions by logic that complies with the Trusted Computing Group (TCG) specification.

21. A method according to claim 19, which further comprises communicating between the USB controller and the secure controller through a serial communications interface.

22. A method according to claim 19, which further comprises communicating between the secure controller and the biometric circuit through a serial communications interface.

23. A method according to claim 19, which further comprises authenticating a user using one of a capacitance, optical and RF scanner circuit.

* * * * *